United States Patent [19]

Matsunaga

[11] Patent Number: 5,080,446
[45] Date of Patent: Jan. 14, 1992

[54] HYDRAULIC PRESSURE CONTROL DEVICE

[75] Inventor: Kunihiro Matsunaga, Yamanashi, Japan

[73] Assignee: Tokico Ltd., Kanagawa, Japan

[21] Appl. No.: 580,283

[22] Filed: Sep. 11, 1990

[30] Foreign Application Priority Data

Sep. 19, 1989 [JP] Japan .................. 1-242931

[51] Int. Cl.$^5$ .................................. B60T 8/18
[52] U.S. Cl. ........................ 303/9.69; 188/195;
 267/33; 267/170; 303/22.8
[58] Field of Search .............. 188/195, 349, 344;
 303/22.1, 22.8, 22.7, 9.69, 9.62, 9.64, 22.5, 22.7;
 180/290; 267/221, 286, 33, 170, 172, 173

[56] References Cited

U.S. PATENT DOCUMENTS

| | | |
|---|---|---|
| 4,062,597 | 12/1977 | Sawyer et al. . |
| 4,150,855 | 4/1979 | Demido ............... 303/22.7 |
| 4,232,909 | 11/1980 | Farr .................... 303/22.7 |
| 4,325,581 | 4/1982 | Pickering ........... 188/195 X |
| 4,579,392 | 4/1986 | Farr .................... 303/22.8 |
| 4,673,224 | 6/1987 | Schmoelzer ........ 303/22.8 |
| 4,733,918 | 3/1988 | Farr .................... 303/22.8 |
| 4,824,180 | 4/1989 | Levrai ................ 303/22.5 |
| 4,828,329 | 5/1989 | Schonlau et al. .... 303/22.8 X |
| 4,828,330 | 5/1989 | Bequet et al. . |

FOREIGN PATENT DOCUMENTS

| | | | |
|---|---|---|---|
| 0261011 | 3/1988 | European Pat. Off. ........ 188/195 |
| 3626331 | 2/1988 | Fed. Rep. of Germany ..... 303/9.69 |
| 3706396 | 9/1988 | Fed. Rep. of Germany ..... 188/195 |
| 57-28095 | 6/1982 | Japan . |
| 63-87352 | 4/1988 | Japan . |
| 2027504 | 2/1980 | United Kingdom ........... 303/9.69 |

*Primary Examiner*—Douglas C. Butler
*Attorney, Agent, or Firm*—Wenderoth, Lind & Ponack

[57] ABSTRACT

A hydraulic pressure control device of a load sensing type is provided. The hydraulic pressure control device includes a spring support disposed on a vehicle body side or wheel side for supporting a suspension spring, a support member tiltably disposed in the spring support for supporting a load of the suspension spring at three support portions, and a hydraulic pressure control valve mounted on the support member for controlling hydraulic pressure supplied to a braking unit mounted on a wheel from a source for generating hydraulic braking pressure. Thus, at least a portion of the force applied to one of the support portions can be applied to a control piston of the hydraulic pressure control valve.

10 Claims, 2 Drawing Sheets

HYDRAULIC PRESSURE CONTROL DEVICE

BACKGROUND OF THE INVENTION

This invention relates to a hydraulic pressure control device for use in the braking system of a vehicle, and more particularly to a device for controlling hydraulic pressure to be supplied to brake units, on which the control device is mounted, in accordance with a load on the vehicle.

In order for braking forces acting on the front and rear wheels to be distributed close to an ideal condition, recent vehicles, such as automobiles, are equipped with a hydraulic pressure control valve in a hydraulic line which connects a master cylinder, i.e. a source for generating hydraulic braking pressure, and wheel cylinders of braking units, such as disk brakes or drum brakes, mounted on rear wheels.

The hydraulic pressure control valve includes a control piston which actuates to repeatedly open or close the hydraulic line, once the input hydraulic pressure from the master cylinder reaches a predetermined level (cut point pressure), so as to regulate the hydraulic pressure issuing from the hydraulic control valve to the wheel cylinders to a value lower than an increasing value of the hydraulic pressure input into the control valve from the master cylinder, thereby effecting a braking force acting on the rear wheels which is smaller than that on the front wheels, whereby the distribution of the braking force on the front and rear wheels is brought close to an ideal condition.

In a vehicle, such as a truck, in which a force loading the rear wheels varies by a substantial amount between an unloaded condition and a loaded condition of the vehicle, there is provided a load sensing type hydraulic pressure control device (LSPV) which adjusts a cut point pressure to higher values in accordance with increases of the load of the vehicle so as to establish correspondingly higher braking forces on the rear wheels.

The hydraulic pressure control device of a load sensing type functions to urge the control piston of the hydraulic control valve disposed in a hydraulic line connecting the master cylinder and wheel cylinder toward a direction in which the hydraulic line is opened by a force proportional to a given load, thus adjusting the cut point pressure to higher value depending upon a given increase in load. There are two types of hydraulic pressure control devices having a load sensing ability. One is an indirect hydraulic pressure control device which utilizes a relative displacement between the vehicle body and the rear wheels, the relative displacement varying in proportion to a change of the load. The indirect hydraulic pressure control device includes a coil spring disposed between the vehicle body and the rear wheel. A force of the spring resulting from a relative displacement between the vehicle body and the rear wheel is utilized to actuate a link mechanism, for example, so as to urge a control piston of the hydraulic pressure control valve toward a direction which will open the hydraulic line. The other is a direct hydraulic pressure control device which includes a suspension spring having one end thereof in abutment with the control piston of the hydraulic pressure control valve so as to urge the control piston of the hydraulic pressure valve toward a direction also opening the hydraulic line. In this regard, reference should be made, for example, to Japanese Patent Publication No. 57-28095 which corresponds to U.S. Pat. No. 4,062,597.

The prior art hydraulic pressure control devices as described above, however, involve several problems as noted below.

In the first mentioned indirect hydraulic pressure control device, it is necessary to adjust the force of the aforesaid coil spring disposed between the vehicle and the rear wheel for biasing the control piston since the device utilizes a relative displacement between the vehicle body and the rear wheel. It is also necessary to periodically re-adjust the biasing force since the vehicle body generally tends to lower this force with time. Further, problems have been experienced in that the hydraulic pressure control device is rather complicated, and has a low durability due to the use of a link mechanism or the like.

On the other hand, the direct hydraulic pressure control device also has a complex in construction since it requires a special mechanism for allowing only a predetermined portion of the load of the suspension spring to be exerted on the control piston of the hydraulic control valve. Furthermore, and with a suspension having a suspension spring with a strut passing therethrough, it is not possible to mount such a suspension spring onto a desired position due to the presence of the strut.

SUMMARY OF THE INVENTION

Considering the above problems, an object of the present invention is to provide a direct hydraulic pressure control device with a load sensing ability which has a simple structure and is applicable to any kinds of suspension.

According to the present invention, there is provided a hydraulic pressure control device of a load sensing type which comprises a support member tiltably disposed between a vehicle body or a wheel and a suspension spring for supporting a load of the suspension spring at three support portions, one of the support portions constituted by a control piston of a hydraulic pressure control valve for controlling hydraulic pressure supplied to a braking unit mounting on a wheel from a source for generating hydraulic braking pressure.

In accordance with the present invention, there is also provided a hydraulic pressure control device of a load sensing type which comprises a spring support disposed on a vehicle body side or wheel side for supporting a suspension spring, a support member tiltably disposed in the spring support for supporting a load of the suspension spring at three support portions, and a hydraulic pressure control valve connected to the support member for controlling hydraulic pressure supplied to a braking unit mounted on a wheel from a source for generating hydraulic braking pressure, whereby at least a portion of the force applied to one of the support portions can be applied to a control piston of the hydraulic pressure control valve.

Thus, according to the present invention, the support member is tiltably mounted and is arranged to bear a load of the suspension spring at the three support portions. Accordingly, it is possible to selectively establish the amount of force applied to each support portion depending upon the disposition of the support portions. By constituting one of the support portions with the control piston of the hydraulic pressure control valve, it is possible to apply a load of the suspension spring directly to the control piston at any constant ratio, with a simplified construction.

The present invention is also applicable to a suspension having a suspension spring with a strut extending therethrough by suitably locating the three support portions of the support member so as not to interfere with the strut. With this construction and by constituting one of the support portions with the control piston of the hydraulic pressure control valve, it is possible to apply a load of the suspension spring directly to the control piston at any desired ratio.

When the support member having the hydraulic pressure control valve secured thereto is disposed within the spring support for the suspension spring, a space required for attachment of the hydraulic pressure control valve can advantageously be reduced.

DETAILED DESCRIPTION OF THE PREFERRED EMBODIMENTS

Figure 1:
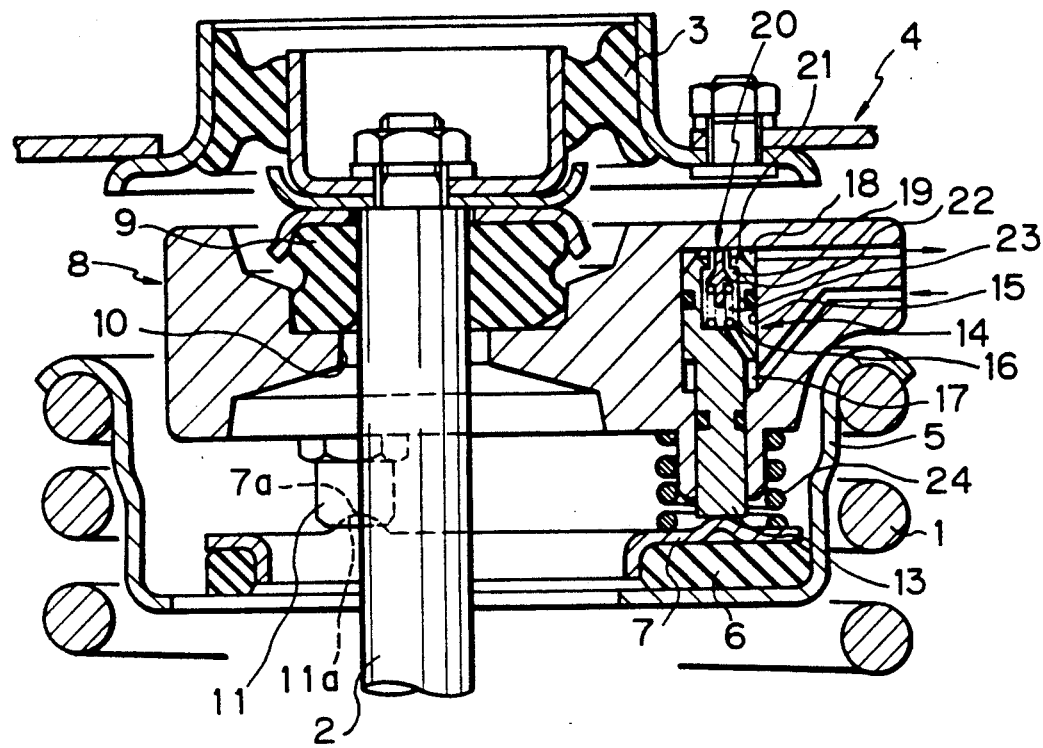
FIG. 1 is a longitudinal sectional view illustrating a first embodiment of a hydraulic pressure control device having a load sensing ability according to the present invention.
Figure 2:
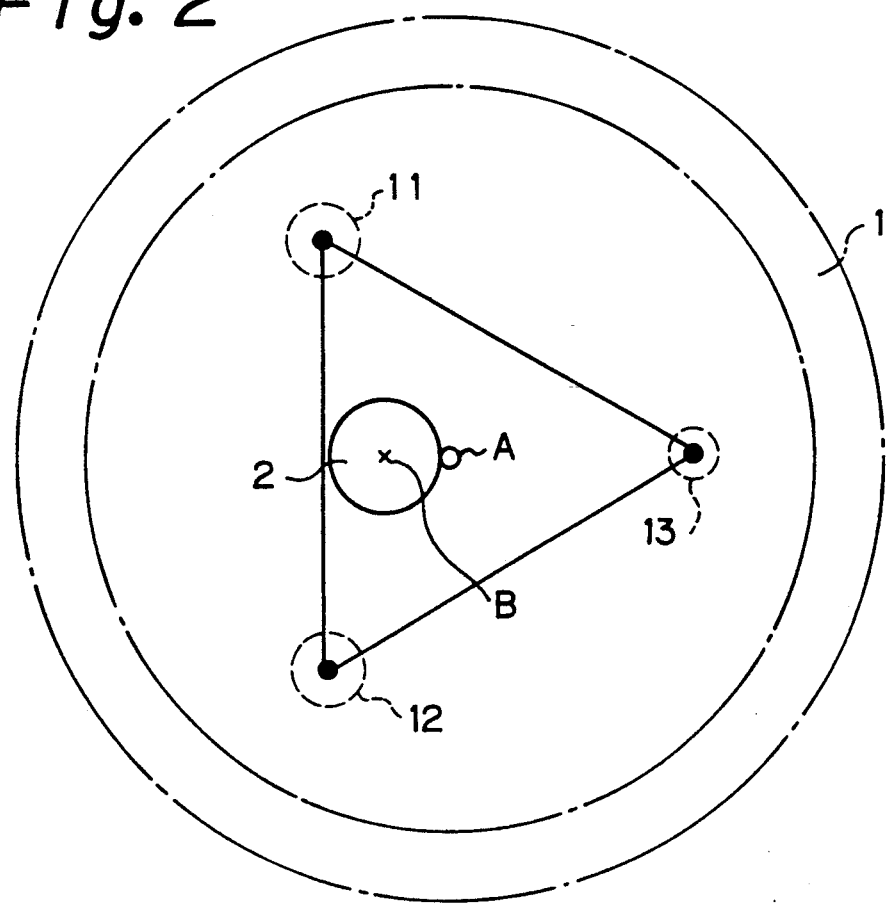
FIG. 2 is a schematic illustration showing a locational relationship between a support portion and a suspension spring of the hydraulic pressure control device shown in FIG. 1.

A first embodiment of a hydraulic pressure control device having a load sensing ability according to the present invention will be explained hereinbelow with reference to FIGS. 1 and 2.

A suspension spring 1 has a strut (only a rod 2 is shown in the drawings) extending therethrough. The rod 2 of the strut is fixed to a vehicle body 4 by means of a rubber mount 3. A spring support 5 having a dishlike configuration is provided for receiving one end of the suspension spring 1. A plate member 7 is disposed within and fixed to the spring support 5 by means of an elastic member 6. Usually, the suspension spring 1 is disposed between the vehicle body 4 and a rear wheel (not shown) in an inclined manner. Accordingly and for the purpose of preventing interference between the suspension spring and the strut, the suspension spring 1 is arranged with its axis displaced from that of the strut. In this connection, the axis of the suspension spring 1 and the axis of the rod are indicated in FIG. 2 with symbols A and B, respectively.

A support member 8 constituting a main part of the present invention is disposed between the spring support 5 and the vehicle body 4. An elastic member 9 is disposed on the side of the support member 8 adjacent to the vehicle body 4, the elastic member 9 supporting the support member 8 in a tiltable fashion. A bore 10 is formed in a generally central portion of the support member 8, the rod 2 of the strut passing the bore 10. Three support portions 11, 12 and 13 are formed on the support member 8 on the side thereof adjacent to the spring support 5, each support portion being in abutment with the plate member 7. The three support portions 11, 12 and 13 are so disposed that each one is located at the respective apexes of an equilateral triangle having its center at the axis A of the suspension spring 1 (see FIG. 2). The elastic member 6 disposed between the spring support 5 and the plate member 7 is intended to avoid any play between the plate member 7 and the support portions 11, 12 and 13. In the illustrated embodiment, the support portions 11 and 12 have at their respective lower surfaces small recesses 11a and 12a, respectively. The small recesses receive therein respective protrusions 7a formed on the plate member 7 so as to allow relative positioning between the support member 8 and the plate 7.

One of the support portions, i.e. support portion 18, is constituted by a control piston of a hydraulic pressure control valve 14, as will be explained later. The construction of the hyraulic pressure control valve will be explained below.

The support member 8 is formed with a cylinder portion 15, which, in turn, receives therein a control piston 13 capable of sliding movement. The cylinder portion 15 is divided into two chambers 17 and 18 by means of a piston portion 16 of the control piston 13. One chamber 17 is communicated with the output of a master cylinder (not shown) serving as a source for generating hydraulic braking pressure, while the other chamber 18 is communicated with a wheel cylinder (not shown) of a braking unit for the rear wheels. The piston portion 16 is designed so that the area of one side thereof for receiving hydraulic pressure in the one chamber 17 is smaller than the area of the other side thereof for receiving hydraulic pressure in the other chamber 18.

The control piston 13 includes a communication passage 19 communicating between the one chamber 17 and the other chamber 18. A valve mechanism 20 is positioned in the communication passage 19, the valve mechanism allowing and preventing communication of the two chambers 17, 18 via communication passage. The valve mechanism 20 includes a valve seat 21 in the communication passage 19, a valve member 22 movable into and out of engagement with the valve seat 21, and a spring 23 urging the valve member 22 toward the valve seat. This valve mechanism is so designed that, when the control piston 13 is displaced toward the one chamber 17, the valve member 22 is seated on the valve seat 21 so as to prevent communciation of the two chambers 17, 18 via communication passage 19.

One end of the control piston 13 protrudes outwardly from the support member 8 so as to constitute one of the above-said support portions. A control spring 24 is disposed between the support member 8 and the plate member 7, the spring 24 receiving therein one end of the control piston 13. It is to be noted that regulation of a load applied to the control piston 13 can be effected by altering the resilient force of the control spring 24.

The operation of the above-mentioned control device will be explained below.

The load on the suspension spring 1 is supported by the three support portions 11, 12 and 13 of the support member 8. Each support portion 11, 12 and 13 bears an equal or even load since they are arranged at respective apexes of an equilateral triangle having its center at the axis A of the suspension spring 1.

When a braking operation is carried out while a vehicle is unloaded, hydraulic fluid output from the master cylinder flows from the one chamber 17 of the hydraulic pressure control valve 14 through the communication passage 19 to the other chamber 18. The hydraulic fluid is eventually supplied to the wheel cylinder, thereby effecting a braking force. When the hydraulic pressure output from the master cylinder increases and the pressure force difference across the piston portion, due to the difference in the pressure receiving areas exceeds a force applied to the control piston 13 by means of the plate 7, the control piston is displaced downwardly as viewed in FIG. 1, and the valve member 22 of the valve mechanism becomes seated on the valve seat 21, thus preventing communication of the chambers 17, 18 via the communication passage. It should be noted that the hydraulic pressure at this moment corresponds to a cut point pressure. With this arrangement and when the hydraulic pressure from the master cylinder increases further, the control piston 13 returns to its original position, thereby allowing communication of the chambers 17, 18 via the communication passage 19. By repetitively opening and closing of the communciation passage 19 in the above manner in response to increases in pressure of the hydraulic fluid from the master cylinder, the rate of increase in pressure of the fluid supplied to the wheel cylinder can be restricted at a lower value.

When a vehicle is loaded, the load applied to each support portion 11, 12 and 13 of the support member 8 becomes greater, since the suspension spring 1 is deflected due to the load and thus exerts a greater force. By this, the force applied to the control piston 13 also becomes greater. Accordingly, and even if the hydraulic pressure output from the master cylinder reaches the cut point pressure which has been established in relation to the above unloaded vehicle, the control piston 13 still remains immobile, thus increasing the cut point pressure. By this, it is possible to obtain a greater braking force for the rear wheels when a vehicle is loaded.

A second embodiment of the present invention will be explained hereinbelow with reference to FIGS. 3 and 4. In this connection, it should be noted that the second embodiment merely differs from the first embodiment in the constitution for tiltably supporting the support portion of the control device. Accordingly, the remaining components of the second embodiment are designated by the same reference characters as those of the first embodiment an explanation thereof is omitted to avoid repetition.

A first bracket 25 fixed to the top of the rod 2 is formed with a pair of protrusions 26 of an elliptic configuration both extending in the same direction. The elliptic protrusions 26 have an arcuate cross section. A second bracket 27 enages with the elliptic protrusions 26 and hence the second bracket 27 is swingable in a plane normal to the sheet of FIG. 3.

Figure 3:
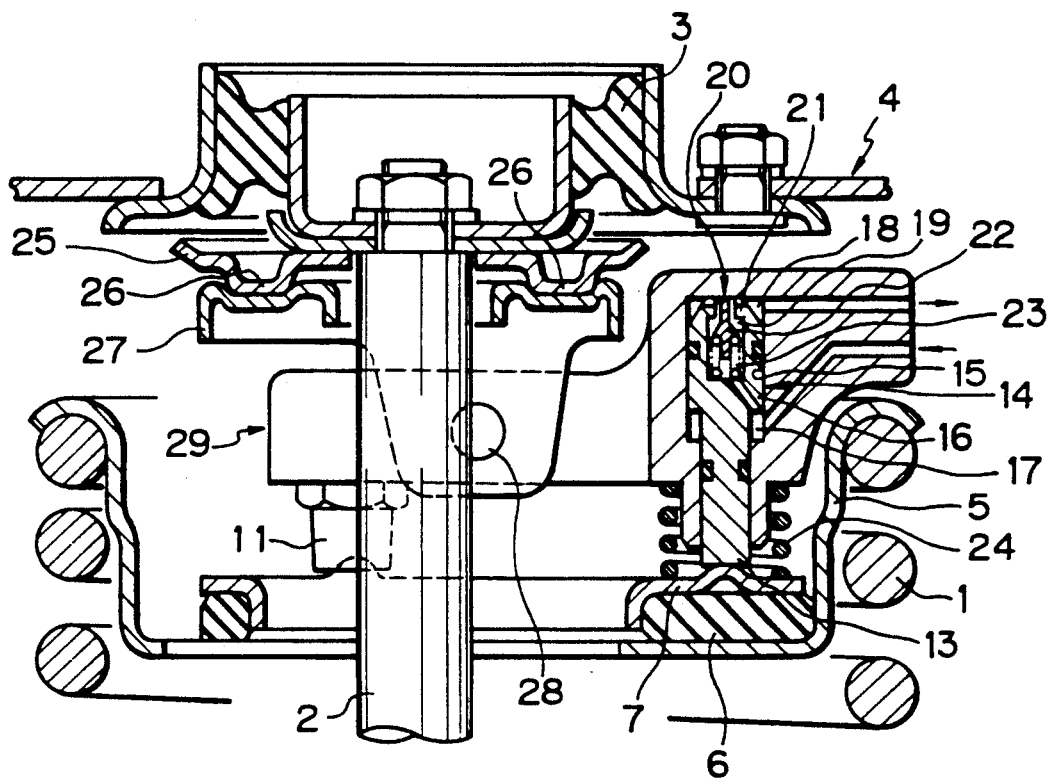
FIG. 3 is a longitudinal sectional view illustrating a second embodiment of the hydraulic pressure control device having a load sensing ability according to the present invention.
Figure 4:
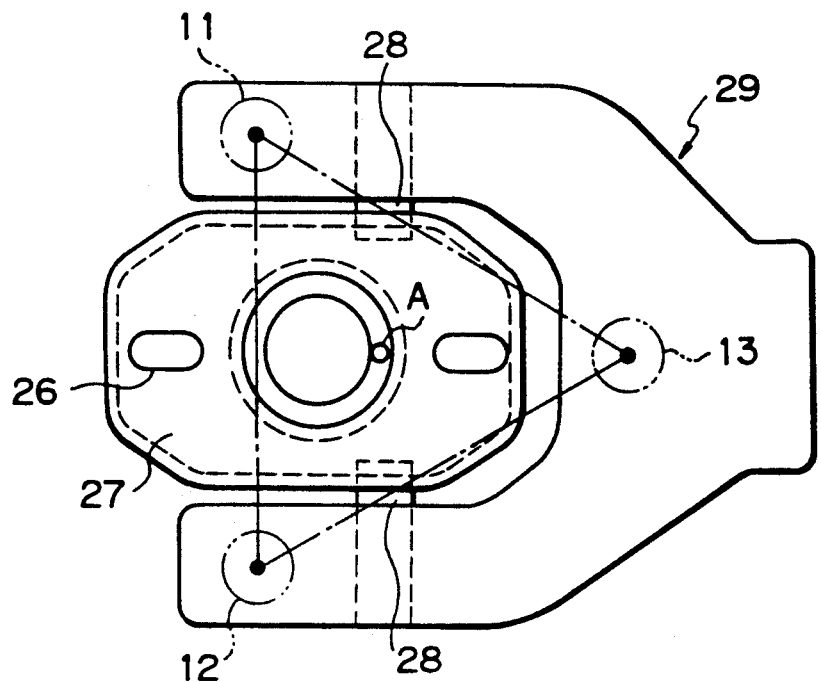
FIG. 4 a plan view illustrating a manner in which a second bracket and a support member of the hydraulic pressure control device of FIG. 3 are connected.

A support member 29 is connected to the second bracket 27 by means of a pin 28 extending in a direction perpendicurlar to the direction in which the elliptic protrusions extend, so that the support member 29 is swingable in a plane vertical to the plane in which the second bracket 27 swings, i.e., the plane of the sheet of FIG. 3.

Similar to the first embodiment, support portions 11, 12 and 13 engaging the plate member 7 are disposed on the support member 29, each support portion being positioned at the respective apexes of an equilateral triangle having its center at the axis A of the suspension spring 1. One of the support portions, i.e., support portion 13, is constituted by a control piston of the hydraulic pressure control valve 14.

With the above construction, the support member 29 is swingably supported by the first and second brackets, thus providing actuation the same as that of the elastic support member 9 of the first embodiment. The operation of the second embodiment is the same as that of the first embodiment and, hence, a detailed explanation of the second embodiment is omitted.

It is to be noted that the present invention should not be limited to the above preferred embodiments and the following constructions may be employed.

While, in the above embodiments, the support portions of the support members 8 and 29 are positioned at the respective apexes of an equilateral triangle having its center at the axis A of the suspension spring 1 so as to equally bear the load acting on the suspension spring, it is possible to displace the position of the control piston 13 of the hydraulic pressure control valve 14 so that support portions define an isosceles triangle. With this construction, it is possible to selectively alter a portion of the total load applied to the control piston 13, whereby operational characteristic of the hydraulic pressure control valve 14 can be appropriately selected.

In the first and second embodiment, the hydraulic pressure control valve is arranged so that a load is directly applied to the control piston thereof. Any arrangement of the hydraulic pressure control valve, however, is possible, provided that the hydrualic pressure control valve is secured to some portion of the support member. The control piston may be so designed that a force is applied thereto indirectly through another additional member.

According to the first and second embodiment, the hydraulic pressure control device according to the present invention is disposed between the suspension spring and the vehicle body. The hydraulic pressure control device according to the present invention may be disposed between the suspension spring and the rear wheel.

While, in the above embodiments, it has been explained that the present invention is applied to a suspension having a suspension spring with a strut or the like passing therethrough, the present invention is also applicable to a suspension having a suspension spring with no strut or the like passing therethrough.

According to the present invention, as having been explained above in detail, the support member bearing the load of the suspension spring at the three support portions is supported for tiltable movement, while constituting one of the support portions is constituted by the control piston of the hydraulic pressure control valve, so that the load of the suspension spring can be applied at a given ratio to the control piston. Thus, the direct, hydraulic pressure control device has a simple structure and permits the cut point pressure to be directly established based on a load of the suspension spring.

By appropriately arranging the support portions, the hydraulic pressure control device of the present invention is also applicable to a suspension having a spring with a strut or the like passing therethrough.

It is also possible to selectively adjust a portion of the total load applied to the control piston by the selective disposition of the support portions, thus enabling any selctive distribution of a braking force. Accordingly, it may be possible to distribute a braking force close to an ideal distribution in accordance with the vehicle weight, driving properties, etc., depending upon the type of vehicle.

What is claimed is:

1. In a vehicle fluid-pressure braking system having a hydraulically actuatable braking unit mounted on a wheel, a source for generating hydraulic braking pressure, and a suspension spring for the wheel, a hydraulic pressure control device comprising:
   a spring support disposed on one end of the suspension spring;
   a support member mounted in the device so as to be tiltable about a portion thereof, said support member also being supported by said spring support at three support locations so as to be subjected to a load of the suspension spring transmitted through said spring support and distributed to the support member at said locations, said three support locations being within said suspension spring as viewed in an axial direction of the suspension spring, and said three support locations defining respective apexes of a triangle;
   cylinder portion means for defining a passageway connecting the source for generating hydraulic braking pressure with the braking unit; and
   hydraulic pressure control valve means for controlling hydraulic pressure supplied to the braking unit from the source for generating hydraulic pressure via said passageway, said control valve means including a movable control piston mounted within said cylinder portion means in a manner in which the control valve means is slidable in the axial direction of the suspension spring, and said control valve means being integrated with said support member in association with one of said three support locations in a manner in which a force exerted at said one of the three support locations by said spring support is transmitted to said control piston.

2. In a vehicle fluid-pressure braking system as claimed in claim 1, and in which a strut member extends through the suspension spring, the hydraulic pressure control device further comprising an elastic member connected to said strut member via said elastic member.

3. In a vehicle fluid-pressure braking system as claimed in claim 2, the hydraulic pressure control device further comprising a second elastic member, and a plate member connected to said spring support via said second elastic member, said support member being supported on said spring support at said support locations via said plate member.

4. In a vehicle fluid-pressure braking system as claimed in claim 1, the hydraulic pressure control device wherein said control piston has one end extending from said cylinder portion means and supported by said spring support at said one of said support locations.

5. In a vehicle fluid-pressure braking system as claimed in claim 4, the hydraulic pressure control device wherein said cylinder portion means is an integral part of said support member.

6. In a vehicle fluid-pressure braking system as claimed in claim 4, the hydraulic pressure control device further comprising a coil spring disposed between said spring support and said support member and surrounding said one end of the control piston.

7. In a vehicle fluid-pressure braking system as claimed in claim 1, and in which a strut member extends through the suspension spring, the hydraulic pressure control device further comprising first and second brackets connected to said strut member, said first bracket also being mounted on said support member for pivotal movement relative thereto and said second bracket also being mounted on said first bracket for pivotal movement relative thereto in a plane perpendicular to a plane in which said first bracket pivots.

8. In a vehicle fluid-pressure braking system as claimed in claim 1, and in which a strut member extends through the suspension spring, the hydraulic pressure control device wherein said support member has a bore extending therethrough, the strut member extending through said bore.

9. In a vehicle fluid-pressure braking system as claimed in claim 1, and in which a strut member extends through the suspension spring, the hydraulic pressure control device wherein said support member has a notch extending therethrough, the strut member extending through said notch.

10. In a vehicle fluid-pressure braking system having a hydraulically actuatable braking unit mounted on a wheel, a source for generating hydraulic braking pressure, and a a source for generating hydraulic braking pressure, and a suspension spring for the wheel, a hydraulic pressure control device comprising:
    a spring support disposed on one end of the suspension spring;
    a support member mounted in the device so as to be tiltable about a portion thereof, said support member also being supported by said spring support at three support locations so as to be subjected to a load of the suspension spring transmitted through said spring support and distributed to the support member at said locations, said three support locations being within said suspension spring as viewed in an axial direction of the suspension spring, said three support locations defining respective apexes of a triangle, and said support member having a cylinder portion defining a passageway therethrough connecting the source for generating hydraulic braking pressure with the braking unit; and
    hydraulic pressure control valve means for controlling hydraulic pressure supplied to the braking unit from the source for generating hydraulic pressure via said passageway, said control valve means including a movable control piston mounted within said cylinder portion in a manner in which the control valve means is slidable in the axial direction of the suspension spring, said control piston being supported by said spring support at one of said three support locations such that a force exerted at said one of said three support locations by said spring support is transmitted to said control piston.

* * * * *